United States Patent
Le Goff et al.

(10) Patent No.: US 11,916,461 B2
(45) Date of Patent: Feb. 27, 2024

(54) ASSEMBLY FOR SUPPORTING AN ELECTRIC MOTOR, NOTABLY IN A MOTOR VEHICLE HEATING, VENTILATION AND/OR AIR CONDITIONING DEVICE

(71) Applicant: Valeo Systemes Thermiques, Le Mesnil Saint Denis (FR)

(72) Inventors: Morgan Le Goff, Le Mesnil Saint-Denis (FR); Geoffroy Capoulun, Le Mesnil Saint-Denis (FR); Emmanuel Rudloff, Le Mesnil Saint-Denis (FR)

(73) Assignee: Valeo Systemes Thermiques, Cergy Pontoise (FR)

( * ) Notice: Subject to any disclaimer, the term of this patent is extended or adjusted under 35 U.S.C. 154(b) by 1527 days.

(21) Appl. No.: 16/071,993

(22) PCT Filed: Jan. 25, 2017

(86) PCT No.: PCT/FR2017/050164
§ 371 (c)(1),
(2) Date: Jul. 23, 2018

(87) PCT Pub. No.: WO2017/129901
PCT Pub. Date: Aug. 3, 2017

(65) Prior Publication Data
US 2019/0074748 A1    Mar. 7, 2019

(30) Foreign Application Priority Data
Jan. 26, 2016    (FR) ........................................ 1650597

(51) Int. Cl.
*H02K 5/24*    (2006.01)
*F16F 15/08*   (2006.01)
(Continued)

(52) U.S. Cl.
CPC ............... *H02K 5/24* (2013.01); *F04D 25/08* (2013.01); *F04D 29/668* (2013.01); *F16F 1/373* (2013.01); *F16F 15/08* (2013.01); *F16F 15/10* (2013.01)

(58) Field of Classification Search
CPC .................................. F16F 1/373; F16F 15/10
See application file for complete search history.

(56) References Cited

U.S. PATENT DOCUMENTS 5,397,950 A * 3/1995 Norbury, Jr. ........... H02K 1/187
                                                                310/58

FOREIGN PATENT DOCUMENTS

DE     101 28 535 A1      7/2002
DE     102005044665 A1 *  3/2007   ............... H02K 5/24
(Continued)

OTHER PUBLICATIONS

International Search Report issued in PCT/FR2017/050164 dated Mar. 23, 2017 (3 pages).
(Continued)

*Primary Examiner* — Melody M Burch
(74) *Attorney, Agent, or Firm* — Osha Bergman Watanabe & Burton LLP

(57) ABSTRACT

The invention relates to an assembly for supporting a motor (1), which comprises two coaxial rings, these being an inner ring (3) able to receive one or more elements of the said motor and an outer ring (4) able to be fixed to a housing forming a structural element (2). The assembly comprises means for limiting the tilting of the inner ring (3) with respect to the outer ring (4), these means including an element (34) which projects from a first of the two rings to become housed in a housing (42) formed in the second of the two rings, and means (7, 22) for reducing the excursion of the element (34) inside the said housing.

17 Claims, 4 Drawing Sheets

Figure 1:
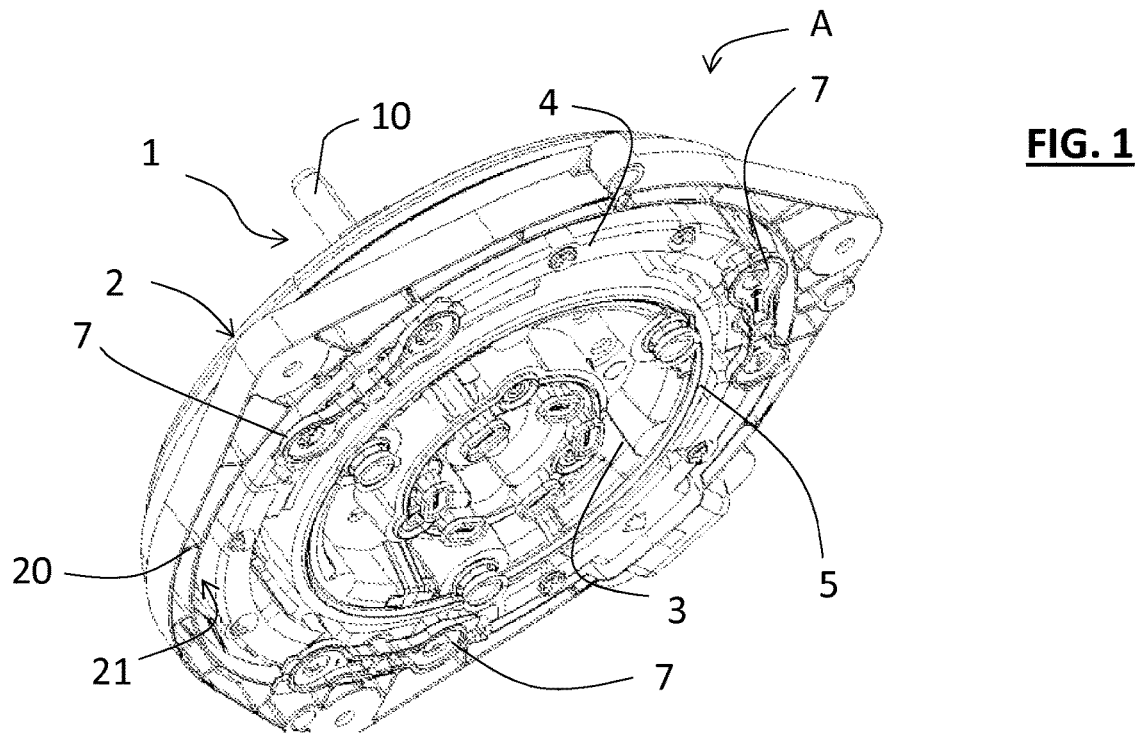

(51) Int. Cl.
*F04D 25/08* (2006.01)
*F04D 29/66* (2006.01)
*F16F 1/373* (2006.01)
*F16F 15/10* (2006.01)

(56) References Cited

FOREIGN PATENT DOCUMENTS

| | | | |
|---|---|---|---|
| DE | 102008042105 A1 * | 3/2010 | ............... H02K 5/24 |
| EP | 0 736 954 A1 | 10/1996 | |
| EP | 1 335 479 A2 | 8/2003 | |
| EP | 1 634 737 A1 | 3/2006 | |
| EP | 1636892 B1 * | 8/2007 | ............... H02K 5/24 |
| EP | 2 456 053 A1 | 5/2012 | |
| JP | 2008071611 A * | 3/2008 | ............... H02K 5/24 |
| WO | WO-03028189 A1 * | 4/2003 | ............... H02K 5/24 |
| WO | 2009/032102 A1 | 3/2009 | |
| WO | 2012/034687 A1 | 3/2012 | |

OTHER PUBLICATIONS

Written Opinion of the International Searching Authority issued in PCT/FR2017/050164 dated Mar. 23, 2017 (8 pages).

* cited by examiner

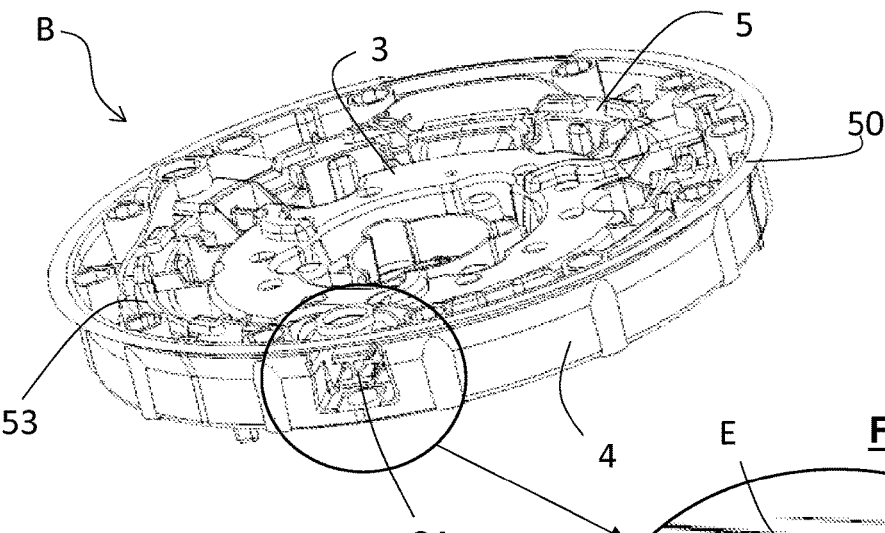
FIG. 5
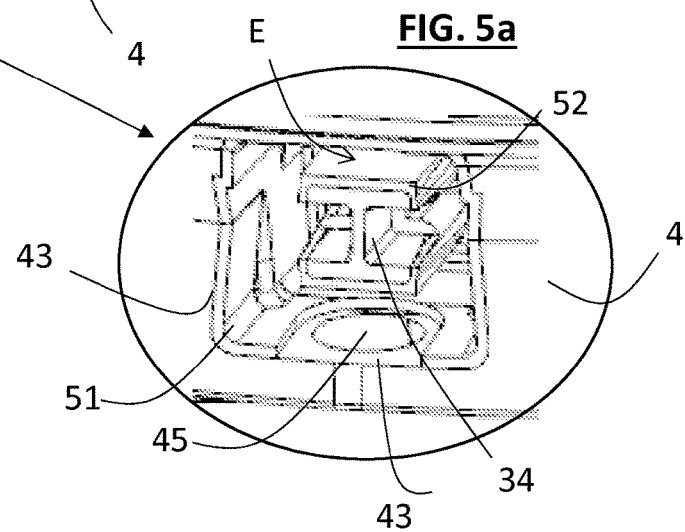
FIG. 5a
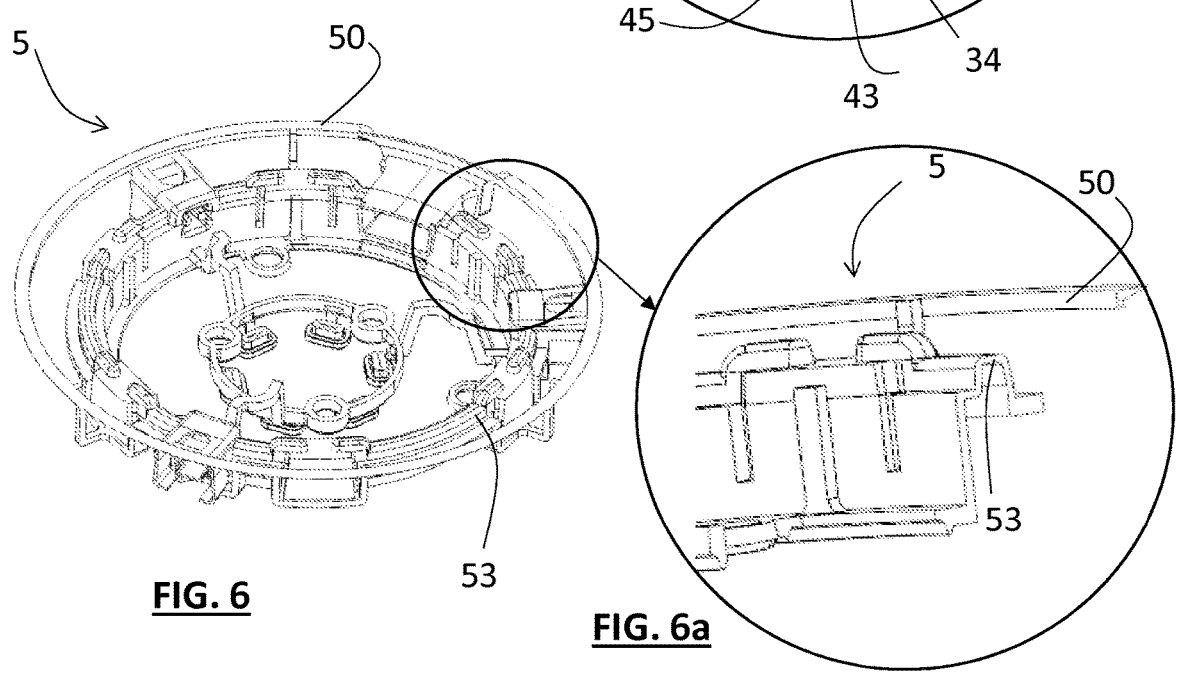
FIG. 6
FIG. 6a

ASSEMBLY FOR SUPPORTING AN ELECTRIC MOTOR, NOTABLY IN A MOTOR VEHICLE HEATING, VENTILATION AND/OR AIR CONDITIONING DEVICE

The present invention relates to the field of heating, ventilation and/or air conditioning devices for motor vehicles, and relates more particularly to an assembly for supporting an electric motor for such a device.

Motor vehicles are commonly fitted with heating, ventilation and/or air conditioning devices which allow one or more streams of air to be generated and the temperature and distribution thereof to the vehicle interior to be managed. These heating, ventilation and/or air conditioning devices comprise, amongst other things, an air-moving device operated by an electric motor to generate an air flow. What is meant by an air-moving device is a device able to suck and/or blow air. The electric motor is notably an electronically commutated electric motor, operated by a power supply module to drive the rotation of a fan wheel.

Electronically commutated electric motors, or direct current motors without brushes (better known as brushless DC motors), comprise a rotor and stator assembly, each of these two components bearing electromagnetic elements the interaction between which causes the rotor to move relative to the stator, and, further on, causes the fan wheel to move. The rotor and the stator are mounted independently of one another in said motor, and it is appropriate to ensure that the relative positioning of these two components is correct in order for the motor to functional optimally.

The electric motor is incorporated into the heating, ventilation and/or air conditioning device by means of a support assembly which advantageously comprises an inner ring configured to accommodate the stator of the electric motor and an outer ring able to be fixed to a structural element of the vehicle forming a casing that accommodates the heating, ventilation and/or air conditioning device.

It will be appreciated that when the motor is in operation the stator is subjected to vibrations and stresses caused by the rotational movement of the rotor, and the objective is for these vibrations not to be transmitted to the outer ring fixed to the structure of the vehicle, in order to avoid premature wearing of the assembly. An uncoupling element is therefore provided between the two rings, and its main role is to filter the acoustic frequencies and vibrations generated by the motor and to eliminate or, at the very least, limit as far as possible, the transmission thereof, via the casing, to the heating, ventilation and/or air conditioning device and to the structure of the vehicle.

This uncoupling element is made in a material capable of performing the role expected of it in terms of the mechanical and acoustic vibrations (for example an elastomer material), said material being inserted between the inner ring that accepts the stator of the motor and the outer ring for connection to the casing that forms a structural element of the vehicle. Provision may be made for this material to be inserted either in the form of an annular ring extending fully between the inner and outer rings of the support assembly, or in the form of a plurality of discrete elements evenly angularly distributed between the inner ring and the outer ring. Whatever the form that this uncoupling element adopts, it is part of its role to limit as far as possible, or even eliminate, in particular, any excessive relative movement of the inner and outer rings relative to one another and, notably, any tilting movement of one of these rings with respect to the other.

It is an object of the present invention to propose a support assembly for a motor vehicle heating, ventilation and/or air conditioning device, which is easy to produce and in which the transmission of the vibrations generated by the operation of the electric motor is reduced as far as possible, if not eliminated.

To this end, one subject of the invention is a support assembly for supporting a motor, notably for a motor vehicle heating, ventilation and/or air conditioning device, which comprises two coaxial rings, one being an inner ring able to accept one or more elements of the motor, and one an outer ring able to be fixed to a casing that forms a structural element. In this support assembly, means are provided for limiting the tilting of the inner ring with respect to the outer ring, these means including a projecting element which projects out from a first of the two rings to become housed in a housing formed in the second of the two rings, and means for reducing the travel of the element within said housing.

According to features of the invention which are suited to the arrangement of the means for reducing the travel, provision may be made for these to extend in a direction substantially parallel to an axis of revolution of said second ring, and/or substantially perpendicular to the direction of elongation of the projecting element.

The projecting element that forms the tilt-limiting means may adopt the form of an anti-tilt finger dimensioned to be inserted in a first orifice arranged within the second of the two rings to form the housing for the finger.

Provision may notably be made for the tilt-limiting means, notably the anti-tilt finger, to be borne by the inner ring and for the housing to be formed in the outer ring, this housing consisting in a first orifice which may or may not be a through-orifice.

According to one preferred embodiment of the invention, the anti-tilt fingers are uniformly angularly distributed on the periphery of the inner ring, and the outer ring comprises as many housing-forming orifices as the inner ring has anti-tilt fingers.

The reducing means may adopt the form of one or more pegs projecting from a wall defining the housing, to extend into this first orifice respectively facing a face of the anti-tilt finger. This or these pegs may notably extend through this wall and become housed inside the housing.

Advantageously, the inner ring has a substantially cylindrical overall shape, and each anti-tilt finger extends radially, from the outer wall thereof, away from a motor-component accommodating orifice arranged at the center thereof.

According to a first series of features of the invention, considered alone or in combination and relating to the two-peg arrangement of the travel-reducing means, provision may be made for:

the pegs to be positioned facing one another, projecting respectively from a wall defining the housing to extend into this first orifice facing a face of the anti-tilt finger;

the two pegs extend into the housing on each side of the anti-tilt finger relative to an axis substantially parallel to an axis of revolution of the inner ring, projecting from two opposite walls;

the opposite walls which axially delimit each housing of the outer ring are pierced, in a direction parallel to that of the axis of the outer ring, respectively with a first open-ended orifice and with a second open-ended orifice so that one of said two pegs can pass respectively through them, and these open-ended orifices are arranged in such a way that their surfaces lie entirely facing the two respective opposite parallel faces of the anti-tilt finger engaged in the relative housing;

the two open-ended orifices are coaxial;

the travel-reducing means comprise a first type of peg forming an axial end stop, whereby each peg is able to be engaged in the first open-ended orifice of a housing, and a second type of peg forming an axial end stop, whereby each peg is able to be engaged in the second open-ended orifice of that same housing;

the first type of peg forming an axial end stop is made up of fixed pegs arranged at the interior surface of a housing formed in the casing to accommodate the assembly formed by the inner ring and the outer ring;

the second type of pegs forming an axial end stop is made up of pegs that are riveted or staked to the second of the two rings;

the support assembly may comprise as many pegs of the first type and pegs of the second type as it comprises housings and anti-tilt fingers.

Provision may be made for the travel-limiting means to be uniformly angularly distributed over the periphery of the ring that bears the housings, notably the outer ring.

In this context, a plurality of pegs of the first type or, respectively, of the second type, may be uniformly angularly distributed on a first face of the outer ring and a plurality of pegs of the second type or, respectively, of the first type, may be uniformly angularly distributed over an opposite second face of the outer ring.

Provision may be made for an uncoupling element to be inserted between the inner ring and the outer ring, to damp vibrations, and for this uncoupling element to extend around at least one of the projecting elements within each housing in which it is engaged, said at least one associated travel-reducing means extending facing the part of the uncoupling element around said projecting element.

According to an alternative form of embodiment, provision may be made for the travel-reducing means to consist of at least one boss of a wall defining said first orifice, said boss being configured to extend into said first orifice facing a face of the anti-tilt finger.

According to one advantageous feature of the invention, each anti-tilt finger exhibits, in cross section, substantially the shape of an H, with a central branch and two parallel branches arranged at each of the ends of the central branch. Further, this central branch advantageously extends parallel to the axis of revolution of the ring that bears the anti-tilt finger.

The invention also relates to a heating, ventilation and/or air conditioning device for a motor vehicle, characterized in that it comprises a motor and an assembly for supporting this motor as described hereinabove. In particular, when the pegs comprise a first type of pegs which are removable and a second type of pegs which are fixed, provision may be made for the removable pegs to be arranged on the opposite side of the support assembly to the motor, the fixed pegs being arranged on the motor side.

Figure 2:
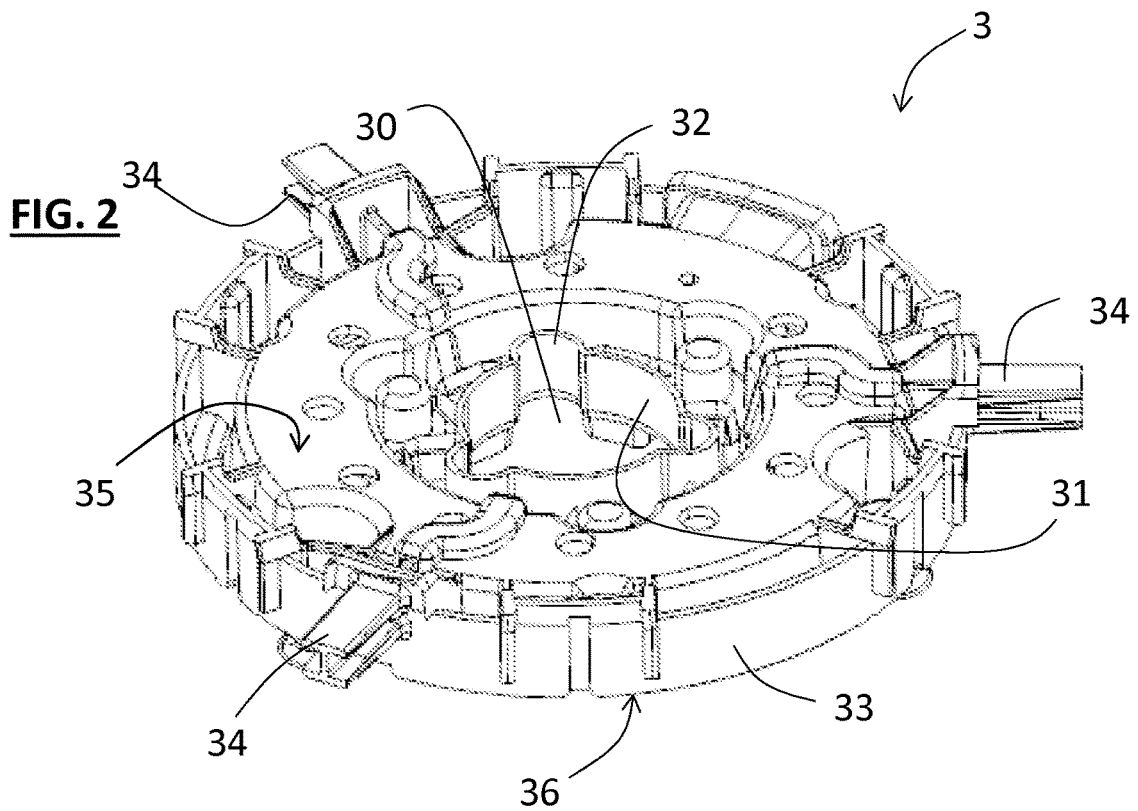
Figure 3:
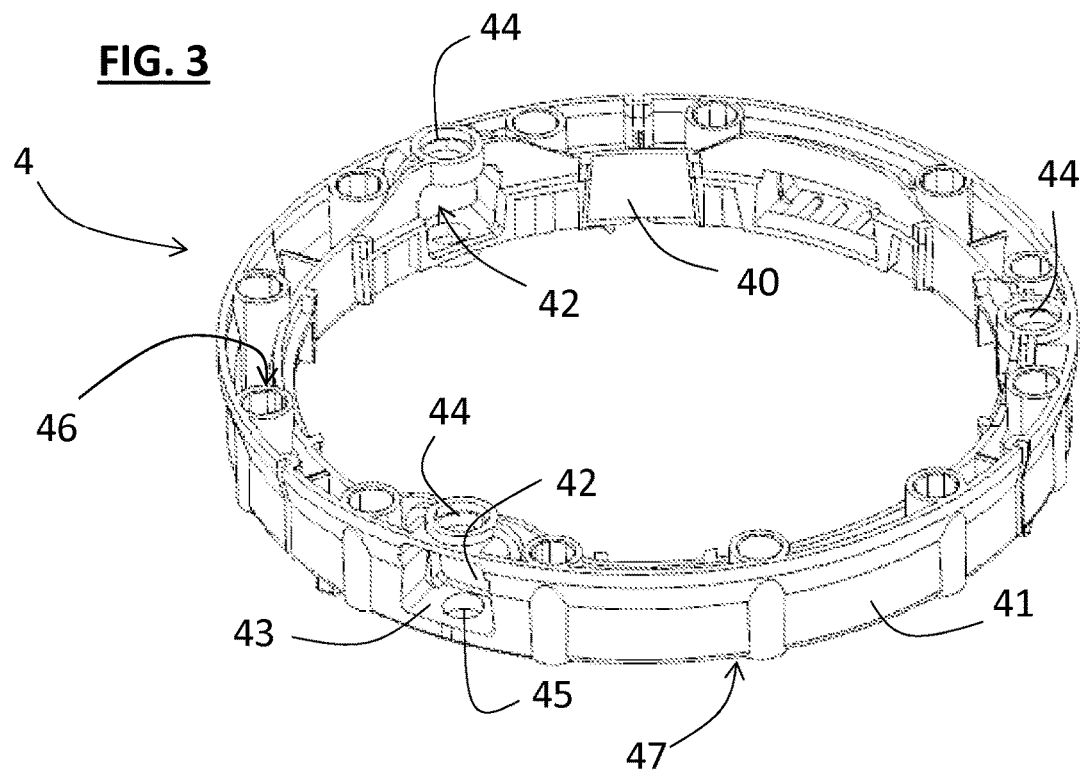
Figure 4:
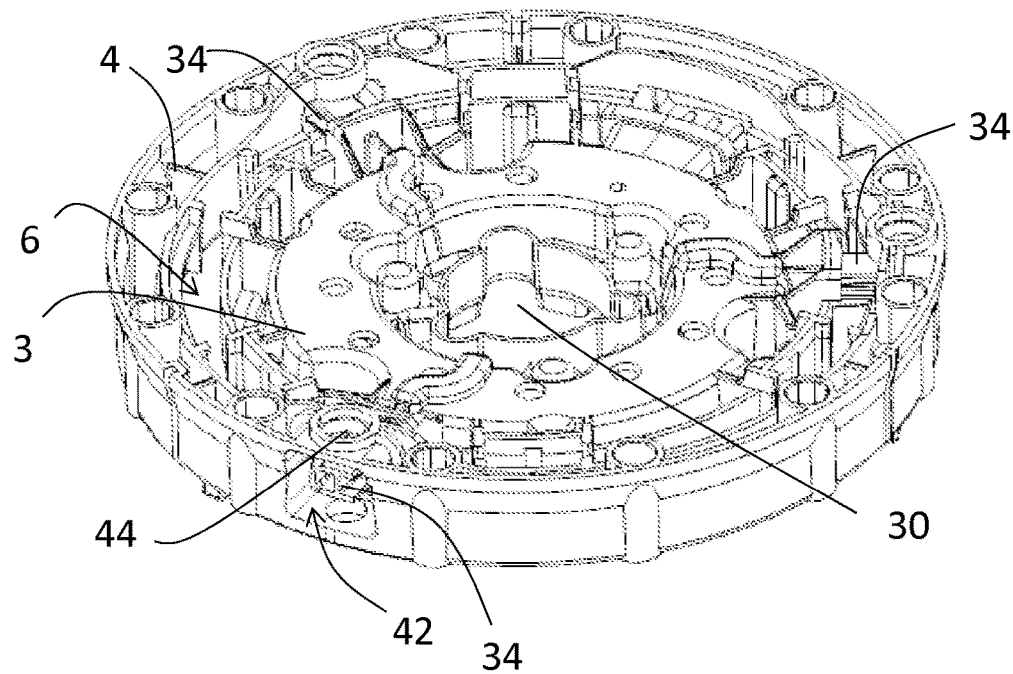
Figure 7:
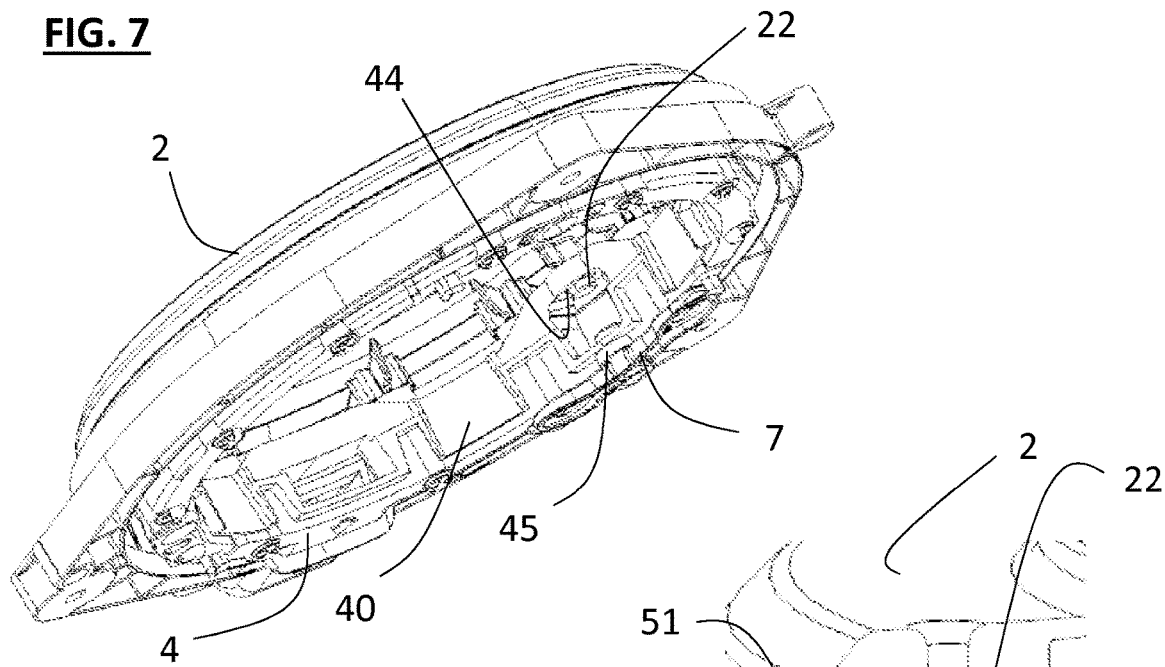
Figure 8:
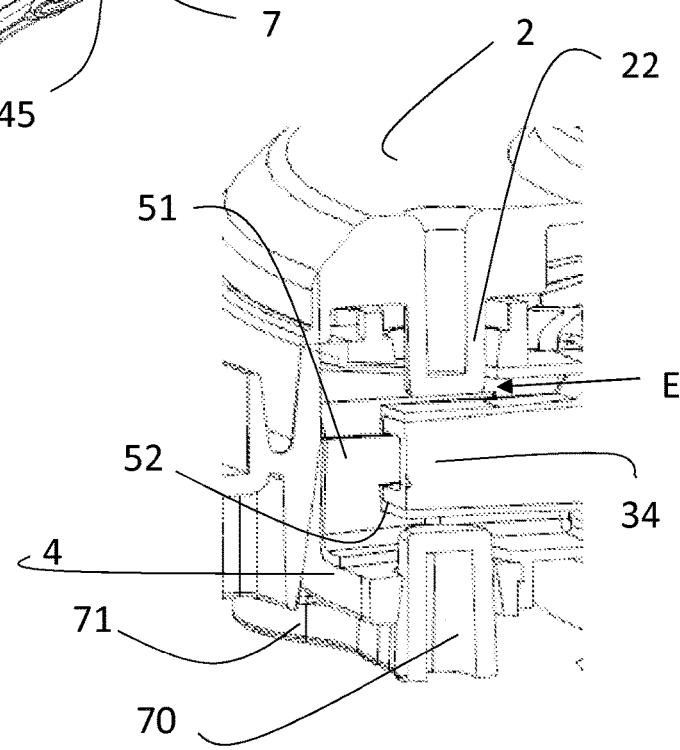
Figure 9:
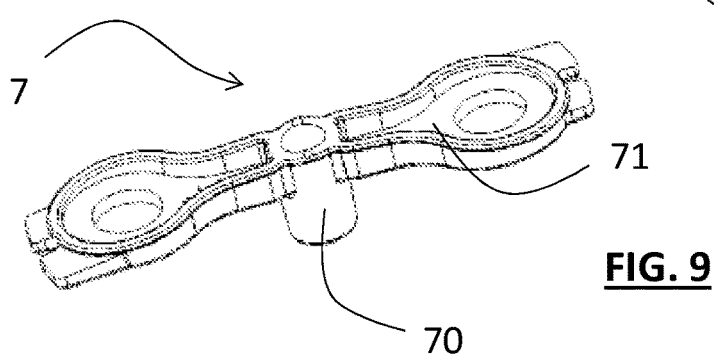

Further features, details and advantages of the invention will become more clearly apparent from reading the description given hereinafter by way of indication, in connection with the following figures:

FIG. 1 is a schematic, perspective, overview of an electric motor support assembly according to a preferred embodiment of the invention, said assembly being mounted in a casing, FIG. 2 is a schematic perspective view of an inner ring of the support assembly of FIG. 1, FIG. 3 is a schematic perspective view of an outer ring of the support assembly of FIG. 1, FIG. 4 is a schematic view, using more or less the same perspective as that of FIGS. 2 and 3, illustrating the assembly comprising the inner ring of FIG. 2 and the outer ring of FIG. 3, FIG. 5 is a perspective view of a support assembly by itself, with an uncoupling element inserted between the inner ring and the outer ring, in which, particularly using detail 5a, the collaboration between an anti-tilt finger borne by the inner ring and a housing passing through the outer ring has been rendered visible, FIG. 6 is a perspective view of the uncoupling element of FIG. 5, with a detail 6a in which a membrane of this uncoupling element is seen in cross section, FIG. 7 is a view of the outer ring of the assembly and of the casing according to the invention, in a perspective view similar to that of FIG. 1, and in which the inner ring and the uncoupling element have been removed in order to make it possible to see the pegs that limit the opening of the housing into which the anti-tilt finger extends, FIG. 8 is a schematic cross-sectioned perspective view of a detail showing the arrangement of the end-stop-forming pegs relative to an anti-tilt finger, and FIG. 9 is a schematic perspective view of a removable end-stop-forming peg of the assembly according to a preferred embodiment of the invention.

It should be noted first of all that the figures set out the invention in detail as regards its embodiment, it of course being possible for said figures to be used for better defining the invention if need be.

FIG. 1 shows an assembly A formed of an electric motor 1, of rotor/stator type, mounted on a support assembly B (visible on its own notably in FIG. 5), itself secured to a structural casing 2 of a heating, ventilation and/or air conditioning device. The support assembly B comprises an inner ring 3 secured to the stator (not visible here) of the electric motor, an outer ring 4, fixed to the casing 2, and an uncoupling element 5 at least part of which is placed between the inner ring 3 and the outer ring 4.

As FIG. 1 shows, the inner ring 3, the outer ring 4 and the uncoupling element 5 are substantially coaxial with the axis of rotation of the rotor/stator assembly of the electric motor 1, embodied by the output shaft 10. Furthermore, the casing 2 more or less forms a shape of revolution substantially about this axis common to the motor and to the support assembly. The casing has a bearing surface 20 and fixing lugs so that it can be pressed against and screwed down onto a corresponding bearing surface, not depicted, and this bearing surface is substantially annular so as to delimit a cavity 21 able to receive and accommodate the support assembly B comprising the inner ring 3, the outer ring 4 and the uncoupling element 5. In other words, the casing 2 has a concave shape and the assembly formed by the inner ring 3, the outer ring 4 and the uncoupling element 5 is accommodated in the cavity formed by the concave part of this casing. Advantageously, the dimensions of the inner ring 3 and outer ring 4 and of the uncoupling element 5 are defined in such a way that, once housed in the casing 2, the assembly that they form lies substantially flush with the bearing surface 20 of this casing.

In what follows, the notions of "top" and "bottom" refer arbitrarily to the orientation of the assembly A as illustrated by FIG. 1. Thus, "top" or "upper" refer to the part and/or components situated, once the assembly A has been produced, on the same side of the bearing surface 20 defined hereinabove as the output shafts 10 of the motor, and "bottom" or "lower" consequently then relate to parts or elements situated on the opposite side to the elements and/or parts referred to as being "top" or "upper". With reference to these arbitrary conventions:

the points of view of FIGS. 2 to 6 are such that components are shown therein with the corresponding upper faces visible, the point of view for FIGS. 1 and 7 more specifically shows the lower parts of the rings, of the uncoupling element and of the casing 2.

With reference to FIG. 2, the inner ring 3 has the overall shape of a cylinder of which the outside diameter is greater than the thickness and of which the thickness is substantially equal to the depth of the receiving cavity 21 formed in the casing 2, as defined above. The inner ring 3 is pierced, substantially axially, with an orifice 30 of substantially cylindrical overall shape, intended to accept components of the motor 1. To that end, special shapes 32 are arranged, substantially radially, from the interior wall 31 delimiting the orifice 30, to encourage the introduction and retention of these components of the motor 1 in the inner ring 3. These special shapes 32 in this instance take the form of notches formed radially from the inner wall 31, and are uniformly angularly distributed over the inner wall 31, there being 3 of them. It goes without saying that any shape, any number and any orientation of the special shapes 32 from the inner wall 31 of the orifice 30 could also be envisioned, so long as they allow the components of the motor 1 that are intended to be placed there inside the inner ring 3 to be inserted and retained therein.

On its outer periphery, the inner ring 3 is bounded by an outer wall 33, the overall profile of which is substantially cylindrical, in which and from which are arranged a certain number of elements projecting radially and able to collaborate with the outer ring 4 and/or with the uncoupling element 5, to contribute to the means of limiting the tilting of the inner ring with respect to the outer ring. It will be appreciated that, without departing from the context of the invention, provision could be made for the projecting elements to extend radially from an interior wall of the outer ring 4, toward the uncoupling element and the inner ring.

In particular, according to the invention, the means for limiting the tilting of the inner ring with respect to the outer ring comprise anti-tilt fingers 34 formed as an integral part of the inner ring 3 and extending radially from the outer wall 33 thereof in the direction away from that of the axis of revolution of the inner ring 3. Advantageously, although not exclusively, whatever the number of them, the anti-tilt fingers are uniformly angularly distributed on the surface of the outer wall 33 of the inner ring 3. However, it is conceivable, for reasons of space or for other mechanical reasons, for the angular distribution of the anti-tilt fingers 34 from the outer wall 33 of the inner ring 3 to be different. According to the preferred embodiment of the invention illustrated by FIG. 2, there are three of the anti-tilt fingers 34 and they are uniformly angularly distributed at the surface of the outer wall 33 with an angle of 120° thus formed between two consecutive anti-tilt fingers 34 on the outer wall 33 of the inner ring 3. According to other embodiments, the number of anti-tilt fingers 34 may differ, without this detracting from the invention.

Advantageously, each anti-tilt finger 34 is inscribed, from the outer wall 33, in a first substantially parallelepipedal volume V (not depicted in the figures) of which the dimension, in the radial direction in which the relevant anti-tilt finger extends, is greater than the other dimensions. In other words, if the radial dimension along which a given anti-tilt finger 34 extends from the outer wall 33 of the inner ring 3 is referred to as its "length", this length is greater than the width and than the height of the first substantially parallelepipedal volume V in which this finger is inscribed. More specifically, within this first substantially parallelepipedal volume V, the anti-tilt finger exhibits, in cross section on a plane perpendicular to the length of this finger, the overall shape of a knocked-over H, the two parallel branches of which are arranged, with reference to the orientations defined above, parallel to an upper face 35 and a lower ace 36 of the inner ring 3. Advantageously, the branches of the anti-tilt finger have substantially the same thickness, whether this be the parallel branches of the H or indeed the central branch of this same H. It will be appreciated that the central branch extends substantially parallel to the axis of revolution of the ring which bears the anti-tilt finger.

With reference to FIG. 3, the outer ring 4 substantially has the shape of a circular annulus with an inner wall 40 and an outer wall 41 defining the thickness of the outer ring 4. The diameter of the, substantially cylindrical, inner wall 40 is greater than the diameter of the substantially cylindrical outer wall 33 of the inner ring 3. More specifically, the diameter of the outer wall 33 of the inner ring 3, excluding the anti-tilt fingers 34, and the diameter of the substantially cylindrical inner wall 40 of the outer ring 4 are defined in such a way that within the assembly that they form with the uncoupling element 5, these two rings allow the uncoupling element to fit between them, in an arrangement coaxial with their common axis, which, when the assembly A is produced, coincides with the output shaft 10 of the motor. As shown more specifically in FIG. 4, these dimensions are defined in such a way that there is a substantially annular space 6 created between the outer wall 33 of the inner ring 3 and the inner wall 40 of the outer ring 4. The diameter and shape of the substantially cylindrical outer wall 41 of the outer ring 4 are, for their part, defined in such a way that the insertion, into the receiving cavity arranged in the casing 2, of the assembly formed by the outer ring 4, the inner ring 3 and the uncoupling element 5 is done without friction and without excessive clearance which could jeopardize the correction operation of the assembly A.

According to the invention, first orifices 42 are arranged radially in the outer ring 4. Each first orifice 42 in this instance is a through-orifice, in as much as it extends radially from the inner wall 40, into which it opens, as far as the outer wall 41, into which it likewise opens. Each through-orifice 42 is delimited by an internal wall 43 and forms, within the annular part of the outer ring 4, a housing with a second substantially parallelepipedal radial volume V' (not indicated in the figures). This second substantially parallelepipedal volume V' that each through-orifice 42 forms in the outer ring 4 is greater than the substantially parallelepipedal volume V in which each anti-tilt finger 34 of the inner ring 3 is inscribed so that each finger can be housed in the housing formed by the first orifice.

Advantageously although not exclusively, whatever the number of them, the through-orifices 42 are uniformly angularly distributed in the annulus that the outer ring 4 forms. However, it is conceivable, for reasons of space or other mechanical reasons, for the angular distribution of the through-orifices 42 within the annulus that this outer ring 4 forms to differ. According to the preferred embodiment of the invention which is illustrated by FIG. 3, there are three through-orifices 42 and they are uniformly angularly distributed within the annulus that the outer ring 4 forms. Thus, an angle of 120° is formed between two consecutive through-orifices 42. According to other embodiments, the number of anti-tilt fingers 34 may be different, without this detracting from the invention. In any event, according to the invention, the number of through-orifices 42 formed within the outer ring 4 needs to be equal to or greater than the number of anti-tilt fingers 34 that the inner ring 3 comprises.

According to the invention, the walls 43 which each delimit through-orifices 42 are pierced axially with at least one open-ended orifice. What is meant by axially is parallel to the axis of revolution of the outer ring 4. In the example illustrated, each through-orifice 42 is provided with two open-ended orifices facing one another, arranged on opposite sides of the corresponding wall. With reference to the naming conventions defined hereinabove and to the orientation of the various figures, a first open-ended orifice 44 is pierced in the internal wall 43 which limits the aforementioned volume V', in its upper part, and a second open-ended orifice 45 is pierced in the internal wall 43 which delimits this same volume V' in its lower part. Each of the first and second open-ended orifices passes through the internal wall 43 in which it is priced, and thus places the volume V' defined by the corresponding through-orifice 42 in the outer ring 4 in communication with, respectively, the upper face 46 and the lower face 47 of the outer ring 4.

Each open-ended orifice has the form of a circular-section bore and it may be advantageous for the centers of the first and second open-ended orifices to be aligned in a direction substantially parallel to that of the common axis of the outer ring 4 and of the inner ring 3. Furthermore, it is of no matter whether the diameters of the first and second open-ended orifices are the same or different.

According to the invention, the inner ring 3 and outer ring 4 are defined in such a way that, within the support assembly that they form with the uncoupling element 5, each through-orifice 42 finds itself radially in the same position as one of the anti-tilt fingers 34. More specifically, the inner ring 3 and outer ring 4 are configured in such a way that each anti-tilt finger 34 of the inner ring 3 extends within the second substantially parallelepipedal volume V' formed by the through-orifice 42 facing which it lies. The length of each of the anti-tilt fingers 34 may be defined in such a way that the finger extends substantially, through the outer ring 4, over all or part of the thickness of the corresponding through-orifice 42. In any event, the length of each anti-tilt finger 34 is defined in such a way that, on the one hand, at least part of the surface area of the first open-ended orifice 44 faces the upper branch of the corresponding anti-tilt finger 34 and that, on the other hand, at least part of the surface area of the second open-ended orifice 45 faces the lower branch of the corresponding anti-tilt finger 34. In other words, each anti-tilt finger 34 forms, within the through-orifice 42 in which it is engaged, an obstruction to the passage of an element (not depicted in the figures) such as, for example, a rod, that one might wish to insert substantially axially so that it passes simultaneously through the first open-ended orifice 44 and the second open-ended orifice 45.

The point of view chosen for FIG. 4 allows a more precise illustration of the configuration of the inner ring 3 and of the outer ring 4 within the assembly B. This figure clearly shows that each anti-tilt finger 34 is engaged in a through-orifice 42 of the outer ring 4 and that, because the inner ring 3 and outer ring 4 are coaxial, their dimensions are defined in such a way that there is, between the outer wall 33 of the inner ring 3 and the inner wall 40 of the outer ring 4, a substantially annular space 6. More specifically, the annular space 6 is made up of successive portions of the one same annular space which are separated from one another by the anti-tilt fingers 34 placed radially between the inner ring 3 and the outer ring 4. It is also clearly visible in FIG. 4 that each anti-tilt finger 34 obstructs, within the through-orifice 42 in which it is engaged, the axial passage from the first open-ended orifice 44 toward the corresponding second open-ended orifice 45.

It should be noted that, as was indicated above, because the second volume V' defined by each through-orifice 42 within the outer ring 4 is greater than the first volume V in which each anti-tilt finger 34 is inscribed, each of these anti-tilt fingers may have an axial, radial, or combination of both, movement within the through-orifice 42 in which it is engaged. These movements, the amplitude of which is substantially of the order of a few millimeters, define the degrees of freedom of the inner ring 3 with respect to the outer ring 4 within the assembly B and, as a result, the degrees of freedom of the motor with respect to the casing 2. Within the support assembly B according to the invention, the uncoupling element 5 allows these vibrations to be damped and allows any movements and jolts of the rotor with respect to the stator to be made as independent as possible from the rest of the heating, ventilation and/or air conditioning device.

The uncoupling element 5 takes the form of a component made from a material exhibiting an ability to damp vibrations, such as, by way of nonlimiting example, an elastomer material. Advantageously, the geometry and the dimensions of the uncoupling element 5 make it able, on the one hand, to be inserted between the inner ring 3 and the outer ring 4 and, on the other hand, between the outer ring 4 and an internal wall of the receiving cavity formed in the casing 2. According to the embodiment illustrated in the figures, the shape of the uncoupling element 5 is defined in such a way that it, amongst other things, occupies the annular space 6 there is between the inner ring 3 and the outer ring 4. The uncoupling element 5 according to this embodiment of the invention also comprises a peripheral lip 50 able to collaborate with the outer periphery of the outer ring 4 and with the inner wall of the casing 2 in which the assembly that it forms with the inner ring 3 and the outer ring 4 is accommodated. According to other embodiments of the invention, the uncoupling element 5 may be made up of several discrete parts which are then placed at predefined zones between the inner ring 3 and the outer ring 4, on the one hand, and between the outer ring 4 and the casing 2 on the other hand, in order to obtain the desired vibration uncoupling properties.

According to the invention, the shape of the uncoupling element 5 is defined in such a way that it substantially, within each through-orifice 42 of the outer ring 4, conforms to the exterior shape of the anti-tilt finger 34 engaged in this through-orifice. More specifically, and as shown by FIG. 5 and FIG. 8, the uncoupling element 5 forms, at each through-orifice 42 of the outer ring 4:

a first wall 51, the shape and dimensions of which are such that it conforms, by being pressed firmly against them, to the walls 43 of the second substantially parallelepipedal interior volume V' formed by the relevant through-orifice 42, a second wall 52 the shape and dimensions of which are such that it conforms to the exterior contours of the anti-tilt finger 34 which extends within the relevant through-orifice 42.

Advantageously, orifices (not identified in the figures) are made in the uncoupling element 5 facing each of the first and second open-ended orifices 44, 45 pierced axially in the walls that delimit each through-orifice 42, so as not to impede the passage from the outside of the outer ring 4 toward the through-orifice 42. Advantageously, these orifices have the same diameter as the corresponding open-ended orifices.

According to another advantageous feature of the invention, the first wall 51 and the second wall 52 are configured in such a way that a small space E (visible in FIG. 8), of the order of a few millimeters, remains between them, particularly axially between the elastomer that covers the upper branch of the finger and the elastomer that covers the upper part of the wall delimiting the through-orifice, and axially between the elastomer that covers the lower branch of the finger and the elastomer that covers the lower part of the wall delimiting the through-orifice. The movements of the anti-tilt fingers 34 inside the through-orifices 42 as a result of relative movements of the inner ring 3 and of the outer ring 4 thus remain possible. However, when the inner ring 3 and the outer ring 4, under the effect of the turning of the motor 1, have movements relative to one another that could cause the anti-tilt fingers 34 to strike the inner walls 43 of the through-orifices 42 within which they extend, these movements are damped by the natural elasticity of the material of which the uncoupling element 5 is made. This then results, on the one hand, in a reduction (or even an elimination) of the transmission of movement from the inner ring 3 to the outer ring 4 (and hence to the casing 2 of the heating, ventilation and/or air conditioning device) and, on the other hand, in the elimination of any clicking noise caused by this striking. It should be noted that the special shape of each anti-tilt finger 34, of which the cross section, in a plane perpendicular to the radial direction in which it extends is substantially in the shape of a knocked-over H, also contributes, by the configuration and dimensions of this H, to the attenuation and damping of vibrations and clicking noises they may cause.

The fact that the small free space E (of the order of 1 to 3 millimeters) still remains around each anti-tilt finger 34 within the corresponding through-orifice 42 nevertheless means that certain vibrations are still transmitted.

As visible in FIGS. 1, 7, 8 and 9, the support assembly comprises means for reducing the travel of the anti-tilt fingers so as to create additional axial end stops that make it possible to reduce still further the possibility of relative axial movement of the inner ring 3 with respect to the outer ring 4. The travel-reducing means are borne by the ring on which the housing is made, in this instance the outer ring, while the anti-tilt fingers are arranged on the other ring in this instance the inner ring. It will be appreciated that the anti-tilt fingers and the means for reducing the travel of these anti-tilt fingers form the means that limit the tilting of the inner ring with respect to the outer ring according to the invention.

The travel-reducing means may consist in the presence, in the housing formed by the first orifice 42, of one or two pegs. In each of these configurations, the peg or pegs are arranged parallel to the axis of revolution of the ring on which the housings are formed, and perpendicular to the axis of elongation of the anti-tilt finger.

According to the nonlimiting embodiment illustrated in these figures, the invention may employ two types of peg, these being a first type of peg 22 which is fixed and a second type of peg 7 which in this instance is removable. In instances in which the travel-reducing means are formed of two pegs arranged one on each side of the anti-tilt finger 34, provision may be made to combine a fixed peg 22 with a removable peg 7, or for two removable pegs 7 to be combined with one another.

A first type of end stop is formed by a set of fixed pegs 22, formed within the casing 2 of the heating, ventilation and/or air conditioning device of the vehicle air conditioning device, given that what is meant by a "fixed" peg is a peg which remains permanently on the casing, or on any structural element which supports same, separating the peg from this structural element leading to one and/or the other being destroyed. According to the invention, each fixed peg 22 is dimensioned and positioned in such a way that when the assembly formed by the inner ring 3, the outer ring 4 and the uncoupling element is accommodated in the receiving cavity 21 of the casing 2, this fixed peg 22 is engaged in a first open-ended orifice 44 pierced in the upper part of the wall 43 delimiting a through-orifice 42. According to various embodiments, the shape of the fixed pegs 22 may be substantially cylindrical or substantially frustoconical. The latter shape may make for easier engagement of the fixed peg 22 in the first open-ended orifice 44. According to the preferred embodiment of the invention indicated in the figures, which is nonlimiting, three fixed pegs 22 are uniformly angularly distributed within the receiving cavity 21, in register with the through-orifices 42 of the ring 4 and the anti-tilt fingers 34. According to other embodiments, the number, location and angular distribution of the fixed pegs 22 may vary. In any case, however, the number of fixed pegs 22 is equal to or less than the number of through-orifices 42 and of anti-tilt fingers 34, and their position is defined in such a way that each fixed peg 22 is, within the support assembly B, engaged in a first open-ended orifice 44. As FIG. 5 and, in greater detail, FIG. 8, show, with reference to the naming conventions and orientations defined above, the height of each fixed peg 22, from the inner wall of the receiving cavity 21, is defined that such once the support assembly B has been created, the free end, or lower end, of the fixed peg 22 lies inside the through-orifice 42 and as close as possible to the upper branch of the anti-tilt finger 34 which it faces. Each fixed peg 22 thus limits the amplitude of any potential axial movement at the corresponding anti-tilt finger 34 may make in its direction.

A second type of end stop employed by the invention is formed by removable pegs 7. According to the nonlimiting preferred embodiment visible in FIG. 1, the invention employs a set of several distinct elementary removable pegs 7, which can be used together or separately. Reference may be made to FIGS. 7 to 9 for details of the structure of these removable pegs 7. Each one of them is made up of a substantially cylindrical stud 70 and of a base 71 (visible notably in FIG. 9) which extends substantially perpendicular to the stud 70, from one of the ends thereof. According to the embodiment illustrated in the figures, the base 71 has a substantially elongate shape, from the center of which the stud 70 extends. The shapes and dimensions of each removable peg 7 are defined such that the stud 70 is able to be engaged in a second open-ended orifice 45 pierced axially in the lower part of the wall 43 delimiting a through-orifice 42. These shapes and dimensions are also defined so that, upon this engagement, the base 71 of the removable peg 7 comes to bear on the lower surface 47 of the outer ring 4. The base comprises at each of its ends an eyelet allowing the indexing and/or fixing of the base 71 on the lower face 47 of the outer ring 4 of the support assembly, in a mechanical fastening of the staking or riveting type.

According to various embodiments, the stud 70 may have a substantially cylindrical or substantially frustoconical shape, its diameter reducing towards its opposite end to the one via which it is attached to its base 71. In the latter instance, the substantially frustoconical shape may make the stud 70 easier to engage in the second orifice 45. Advantageously, the number of removable pegs 7 is therefore identical to the number of through-orifices 42 and to the number of anti-tilt fingers 34. As shown more specifically in FIG. 8, the height of the stud 70 of each removable peg 7 is defined in such a way that, once the removable peg 7 is in place, the free end of its stud 70 lies inside the through-orifice 42 and as close as possible to the lower branch of the anti-tilt finger 34 which it faces. Each removable peg 7 thus limits the amplitude of a potential axial movement that the corresponding anti-tilt finger 34 may make in its direction.

The fixed pegs 22 on the one hand, and the removable pegs 7 on the other, thus make it possible to limit the axial movements of the inner ring 3 with respect to the outer ring 4. What is meant by axial movements is movements along the axes of the first and second open-ended orifices 44, 45 in a direction substantially parallel to the axis of revolution of the outer ring and/or substantially parallel to the axis of revolution of the inner ring. It will be appreciated that the anti-tilt fingers 34 are arranged in such a way that the parallel branches are positioned perpendicular to the axis of revolution of the rings in order to offer a bearing surface which is perpendicular to the pegs that form the travel-reducing means.

FIG. 6 shows the particular cut of the uncoupling element 5. The latter, in its part situated between the inner ring 3 and the outer ring 4, exhibits a set of rims 53 of which the cross section, on a radial plane, is substantially in the shape of an inverted U of which the base is oriented, according to the naming conventions and orientations defined above, toward the upper part of the assembly B. The rims 53, through their U-shape, form a set of bellows which increase the freedom of movement of the inner ring 3 with respect to the outer ring 4, both tangentially and axially, without the risk of the uncoupling element 5 becoming torn during such movements.

The invention therefore makes it possible, by virtue of the presence of the anti-tilt fingers 34 of the inner ring 3 which extend into the through-orifices 42 of the outer ring 4, to create, between the inner ring 3 and the outer ring 4, a connection which both prevents any disconnection between the two rings and allows relative movements of one of these rings with respect to the other. By virtue of the presence of the uncoupling element 5 and of the existence of the first and second walls 51, 52 thereof, this connection is able to greatly limit any transmission, to the outer ring 4, of any vibration that may result from movement or jolting of the motor 1 during operation. The fact that the anti-tilt fingers 34 are produced as an integral part of the inner ring 3 also makes it possible to simplify the manufacture of the assembly formed of the inner ring 3, of the outer ring 4 and of the uncoupling element, and to reduce the production costs thereof.

In addition, through the presence of the fixed pegs 22 and removable pegs 7, the invention makes it possible, while at the same time maintaining a certain degree of freedom of movement of the inner ring 3 with respect to the outer ring 4, an additional reduction in the relative tilting movements (particularly relative movements directed along the axes of these rings) that these two rings may experience relative to one another. It should be noted that, according to various embodiments and implementations of the invention, the removable pegs 7 may all be fitted or just some of them may be used. Likewise, should it appear preferable, for cost reasons, for these removable pegs 7 all to have the same shapes and sizes, it is entirely conceivable, without detracting from the invention, for various shapes to be produced, particularly as regards the base 71, and for various lengths of stud 70 to be used on the one same assembly B, in order to meet specific mechanical objectives.

The assembly made up of the inner ring 3, the outer ring 4 and the uncoupling element 5 as have just been described, can be obtained by a method of manufacture similar to the one described hereinafter. In a first step of this method, the inner ring 3 and the outer ring 4 are formed by injecting a polymer material into a mold, in a single operation. During this operation, a first slide is fitted in each through-orifice 42 intended to accept an anti-tilt finger 34. The shapes and dimensions of this first slide are such that its presence, within a given through-orifice, defines, as the material of which the inner ring 3 is made is being injected, the shape and dimensions of the anti-tilt finger intended to be engaged in the corresponding through-orifice. More specifically, advantageously, the shape and dimensions of this first slide define both the volume V' of each through-orifice 42 and the exterior shapes and dimensions of the anti-tilt finger 34 engaged within it.

In a second step of the method, the first slide is removed and replaced, within each through-orifice 42 of the outer ring 4, by a second slide, and then the material of which the uncoupling element 5 is made is injected into the mold, the inner ring 3 and outer ring 4 still being in place in this mold. Advantageously, the shapes and dimensions of the second slide are, here, such that the presence of this second slide defines, as the material of which the uncoupling element is made is being injected, the shapes and dimensions of the first and second walls 51, 52 defined hereinabove.

During a final step of the method, the assembly is demolded.

The invention such as has been described, is not, however, restricted to the embodiments and configurations described and illustrated by the present document but extends to all equivalent embodiments and/or configurations and to any technically feasible combination of such embodiments and/or configurations. In particular, while the anti-tilt fingers described here all have the same shapes and sizes, it is entirely conceivable, without detracting from the invention, for the dimensions and/or shapes of all or some of them to differ, provided that these anti-tilt fingers offer the same functions and advantages as those described here. The same is true of the first orifices within which these anti-tilt fingers extend. Likewise, while the uncoupling element described here is made up of a single piece, it is entirely conceivable, without detracting from the invention, for it to be made up of several discrete elements placed at various points on the support and connecting assembly according to the invention, provided that these elements offer the functional features described here. Finally, while the removable pegs are introduced here as being a set of separate distinct elements which can be used separately or together, it is entirely conceivable for these removable pegs all to be borne by a single, removable, annular ring which can be positioned against the lower face (with reference to the naming conventions defined at the start of the present document) of the outer ring.

The invention claimed is:

1. A support assembly for supporting a motor, comprising:
   two coaxial rings, one being an inner ring able to accept one or more elements of said motor and one being an outer ring able to be fixed to a casing that forms a structural element; and
   tilt limiters limiting the tilting of the inner ring with respect to the outer ring, comprising a projecting element which projects out from a first of the two rings to become housed in a housing formed in a second of the two rings, and travel limiters reducing travel of the projecting element within said housing, and a first type of peg of two pegs forming an axial end stop, whereby each peg is able to be engaged in a first open-ended orifice of said housing, and a second type of peg of said two pegs forming an axial end stop, whereby each peg is able to be engaged in a second open-ended orifice of that said housing, wherein the travel limiters comprise said two pegs positioned facing one another, projecting respectively from a wall defining said housing to extend into said housing facing a face of the projecting element, and wherein the first type of peg forming an axial end stop is made up of fixed pins arranged at an interior surface of a receiving cavity formed in the casing to accommodate the assembly formed by the inner ring and the outer ring.

2. The assembly as claimed in claim 1, wherein the travel limiters extend in a direction substantially parallel to an axis of revolution of the inner ring.

3. The assembly as claimed in claim 1, wherein the travel limiters extend in a direction substantially perpendicular to the direction of elongation of the projecting element.

4. The assembly as claimed in claim 1, wherein the travel limiters consists of at least one of said two pegs projecting from a wall defining said housing to extend into said housing facing a face of the projecting element.

5. The assembly as claimed in claim 4, wherein the at least one of said two pegs extends through said wall to become lodged inside said housing.

6. The assembly as claimed in claim 1, wherein said two pegs extend into said housing on each side of the projecting element relative to an axis substantially parallel to an axis of revolution of the first of the two rings, projecting from two opposite walls.

7. The assembly as claimed in claim 6, wherein the opposite walls which axially delimit each housing formed in the second of the two rings are pierced, in a direction parallel to that of the axis of said second ring, respectively with the first open-ended orifice and with the second open-ended orifice so that one of said two pegs can pass respectively through them, and in that said first and second open-ended orifices are arranged in such a way that their surface areas lie entirely facing two respective opposite parallel faces of the projecting element engaged in said housing.

8. The assembly as claimed in claim 7, wherein the two open-ended orifices are coaxial.

9. The assembly as claimed in claim 1, wherein the second type of peg forming an axial end stop is fixed to the second of the two rings by staking or by screw fastening.

10. The assembly as claimed in claim 1, further comprising a number of housings, projecting elements, and a same number of pegs of the first type and pegs of the second type as the number of the housings and the projecting elements.

11. The assembly as claimed in claim 1, wherein the travel limiters are uniformly angularly distributed on a periphery of the second of the two rings.

12. The assembly as claimed in claim 1, wherein a plurality of the first type pegs or, respectively, of the second type peg, is uniformly angularly distributed on a first face of the second of the two rings and a plurality of the second type pegs or, respectively, of the first type peg, is uniformly angularly distributed on an opposite second face of the second of the two rings.

13. The assembly as claimed in claim 1, wherein the travel limiters consist of at least one boss on a wall defining said housing, said boss being configured to extend into said housing facing a face of the projecting element.

14. The assembly as claimed in claim 1, wherein an uncoupling element is inserted between the inner ring and the outer ring and wherein the uncoupling element extends about at least one of the projecting elements within each housing in which it is engaged, at least one associated travel limiter of the travel limiters extending facing a part of the uncoupling element around said projecting element.

15. The assembly as claimed in claim 1, wherein the projecting element is formed by an anti-tilt finger extending from an outer wall of the inner ring to be engaged in a first orifice arranged in the outer ring to form said housing for the anti-tilt finger.

16. A heating, ventilation and/or air conditioning device for a motor vehicle, comprising: a motor; and an assembly for supporting the motor as claimed in claim 1.

17. The heating, ventilation and/or air conditioning device as claimed in claim 16, wherein:

the travel limiters comprise the two pegs positioned facing one another, projecting respectively from a wall defining said housing to extend into said housing facing a face of the projecting element, the first type of the two pegs forming an axial end stop, whereby each peg is able to be engaged in the first open-ended orifice of a housing, and the second type of the two pegs forming the axial end stop, whereby each peg is able to be engaged in the second open-ended orifice of said housing, the first type of peg forming an axial end stop is made up of fixed pegs arranged at the interior surface of the receiving cavity formed in the casing to accommodate the assembly formed by the inner ring and the outer ring, the second type of peg forming an axial end stop is fixed to the second of the two rings by staking or by screw fastening, and the second type of peg being arranged on an opposite side of the support assembly to the motor, the first type of peg being arranged on the motor side.

* * * * *

UNITED STATES PATENT AND TRADEMARK OFFICE
CERTIFICATE OF CORRECTION

PATENT NO. : 11,916,461 B2
APPLICATION NO. : 16/071993
DATED : February 27, 2024
INVENTOR(S) : Morgan Le Goff et al.

It is certified that error appears in the above-identified patent and that said Letters Patent is hereby corrected as shown below:

On the Title Page

At (73) Assignee, the city should be listed as Le Mesnil Saint Denis (FR).

Signed and Sealed this
Fourth Day of June, 2024

Katherine Kelly Vidal
*Director of the United States Patent and Trademark Office*